Patented Apr. 22, 1941

2,239,543

UNITED STATES PATENT OFFICE 2,239,543

MINERAL FORTIFICATION OF FOODSTUFFS

John S. Andrews, St. Paul, and Lacey H. Evans and Louis J. Huber, Minneapolis, Minn., assignors to General Mills, Inc., a corporation of Delaware No Drawing. Application October 9, 1939,
Serial No. 298,692

5 Claims. (Cl. 99—83)

This invention relates to the mineral fortification of foodstuffs such as flour, cereals, and edible cereal products with salts of phytic acid and more particularly to the fortification with the copper, manganese and iron salts of this acid.

The principal object of our invention is to increase the copper, iron and/or manganese content of foodstuffs by the addition thereto of colorless, non-ionizing compounds of phytic acid, said compounds being non-ionizing in water, and insoluble in water and in dilute acids.

Another object of our invention is to restore the naturally occurring mineral constituents of whole cereal grains to milled or refined flour and other edible cereal products so that the final product will have approximately the same mineral content as that of the product prior to refining or milling.

A further object of our invention is the provision of a method of inclusion in foodstuffs of non-ionized iron, manganese and copper compounds of phytic acid, and which because of their non-ionization, under normal conditions, do not accelerate the development of rancidity in such foodstuffs.

A still further object of our invention is to provide assimilable mineral-fortified food compounds containing non-ionizing salts of phytic acid which are capable of preventing or correcting mineral deficiencies in animals when included in the diet of such animals.

In the milling of flour and other cereal products, a portion of the naturally occurring mineral constituents such as iron, copper, manganese and calcium salts, are removed in the refining or milling operation and are found in the offal or by-products. Attempts have heretofore been made to restore these mineral constituents to the flour or other cereal products so that they will contain at least the equivalent mineral content of that present in the grain prior to milling thereof. For example, an iron oxide saccharate solution has been applied to flour, as by spraying, but such a solution imparts a brown color to the flour which renders the flour undesirable for commercial purposes. Also, ferric chloride solution has been applied to flour but since it is highly ionized, it accelerates the development of rancidity in the flour and it also imparts an objectionable color to the flour.

Our invention is based upon the discovery that the above-mentioned disadvantages may be obviated by incorporating a suitable amount of a non-ionized appropriate salt of phytic acid which is insoluble in water and in dilute acids into the flour or other foodstuff. These salts may be incorporated in the foodstuff in any desired manner. For example, when flour is to be treated, the powdered salt is blended with the flour by suitable mixing therewith, in a proportion of about 1 part of the salt to 1,000 parts of flour. If desired, a colloidal suspension of the salt of phytic acid may be sprayed on an edible cereal product.

In practicing our invention, we first prepare a suitable salt of phytic acid. For example, if iron phytate is desired, phytic acid is reacted with ferric chloride and iron phytate and free hydrochloric acid are formed, probably as shown in the following equation:

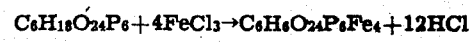
$$C_6H_{18}O_{24}P_6 + 4FeCl_3 \rightarrow C_6H_6O_{24}P_6Fe_4 + 12HCl$$

The iron phytate, as formed above, may be centrifuged or filtered to separate it from the free hydrochloric acid. It is then washed with water to complete the removal of hydrochloric acid and associated impurities and it is then dried by a current of warm air at a temperature preferably not in excess of 50° C. The salt is then pulverized to the desired degree of fineness. For example, all of the salt should be able to be passed through a 200 mesh screen. The iron phytate salts utilized in our invention are insoluble in water and in dilute acids.

If it is desired to utilize copper, or manganese phytates instead of iron phytate, we may react phytic acid with copper chloride, or manganese chloride, to produce copper phytate, or manganese phytate, respectively. These reactions are illustrated by the following equations:

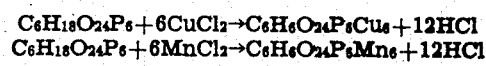
$$C_6H_{18}O_{24}P_6 + 6CuCl_2 \rightarrow C_6H_6O_{24}P_6Cu_6 + 12HCl$$
$$C_6H_{18}O_{24}P_6 + 6MnCl_2 \rightarrow C_6H_6O_{24}P_6Mn_6 + 12HCl$$

The salts, as thus prepared, may be used to fortify any suitable food product, such as flour, by mixing the salt with the flour in the following relative proportions: .002% to 1%, by weight, of the salt, or .002 lb. to 1 lb. per 100 pounds of flour, or other food.

While iron phytate has been specifically mentioned above, it will be understood that other salts of phytic acid such as copper phytate, or manganese phytate, may be used instead of the iron phytate for the fortification of foods. However, the latter compound is preferred because iron is required for the formation of hemoglobin. Also, copper and iron phytate together are beneficial and necessary to provide a mineral-fortified food which will correct anemic conditions.

While the exact structural formula of iron phytate which is chemically known as iron inositol hexaphosphate, is not known, it is believed that its structural formula is as follows:

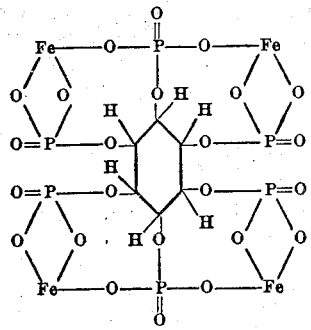

It will be noted in the above formula, that there are six phosphate (PO4) groups present in the molecule. We have found that by acid, water, or enzymatic hydrolysis, we may remove or substitute one or more of the phosphate groups from the above-described molecule and provide a compound which may be substituted for the iron inositol hexaphosphate and still obtain colorless iron complexes which can be added to cereal products.

The following specific example of a test of the hemoglobin regenerating capacity of iron phytate as compared with that of a compound—saccharated iron oxide—known to be efficient in this respect is given as an illustration of one of the applications of our invention.

The test was carried out according to the method of Elvehjem and Kemmerer (J. Biol. Chem., 93:189 (1931)) as follows:

Three litters of rats were placed at birth in cages with their mothers. No feed was placed in the cage except whole milk, certified. The mothers were fed a grain mixture in a separate cage, and carefully brushed off before being returned to their young. In this way the young had no access to iron except that in the milk which is practically devoid of it.

At weaning, the young were continued on the whole milk diet up to the present time. Three days after weaning the feeding of 0.5 mg. of iron and 0.05 mg. of copper daily was started, the rats being divided equitably as to sex, weight and origin (litter) into two groups, one receiving iron phytate, the other iron oxide.

The hemoglobin was determined at weaning and three days later using a Hellige wedge hemometer. Readings were also taken at weekly intervals after starting the experiment.

Results of hemoglobin readings:

Iron phytate group

| Rat No. | Hemoglobin (gr. per 100 cc.) | | |
|---|---|---|---|
| | At weaning | 1st week | 2nd week |
| 1 | | 11.5 | 12.4 |
| 2 | 6.3 | 11.1 | 13.5 |
| 3 | 6.3 | 9.9 | 11.7 |
| 4 | 6.3 | 11.2 | 12.4 |
| 5 | 6.9 | 7.6 | 12.5 |
| 6 | 7.3 | | 12.1 |
| 7 | 7.5 | 11.3 | 11.6 |
| Average | 6.8 | 10.4 | 12.3 |
| | | | Average gain 5.5 |

Saccharated iron oxide group

| Rat No. | Hemoglobin (gr. per 100 cc.) | | |
|---|---|---|---|
| | At weaning | 1st week | 2nd week |
| 8 | 7.5 | 10.6 | 11.4 |
| 9 | 7.2 | 10.7 | 12.5 |
| 10 | 6.5 | 11.8 | 11.5 |
| 11 | 6.7 | 10.3 | 12.3 |
| 12 | 6.3 | 10.3 | 12.0 |
| 13 | | 12.4 | 13.0 |
| 14 | | 10.2 | 12.5 |
| Average | 6.8 | 10.9 | 12.3 |
| | | | Average gain 5.5 |

The above table shows that iron phytate is utilized in the formation of hemoglobin in the same manner as other iron compounds, such as saccharated iron oxide.

Phytic acid is a natural constituent of cereal grains, usually being present in the form of calcium-magnesium salts. Therefore, the addition of a salt of phytic acid to a refined flour or cereal product does not result in introducing into the flour or product any foreign substance.

It will, of course, be understood that the above-mentioned phytate salts are colorless, tasteless, and odorless and relatively non-hygroscopic and stable on storage. Therefore, one or more of these salts may be mixed or incorporated with flour or other cereal products during or after the milling thereof and the treated product will retain its original composition unimpaired.

Tannins occur in practically all natural food products and would give, with ionized iron, definite ink-like discoloration. Inks are quite frequently made by the use of ferric salts and tannic acid. However, we have found that our non-ionized copper and iron phytate do not react with tannic acid under normal conditions. No discoloration occurs in food products which contain tannin, when iron or copper phytate is added to them.

By the term "cereal products" as used in this specification and in the claims, we mean a product derived wholly or substantially from cereal grains or products derived from the milling thereof. As examples of these products, we may cite farina, doughnut flour, bread and cake flours, breakfast cereals, pancake and biscuit flours.

The foregoing detailed description has been given for clearness of understanding only and no unnecessary limitations should be understood therefrom.

We claim as our invention:

1. The method of fortifying edible flour and breakfast cereal with minerals which consists in mixing a non-ionized salt of phytic acid, selected from the group consisting of copper, iron, and manganese phytates, with the edible product in the proportion of approximately .002% to 1%, by weight, of the phytate salt.

2. The method of fortifying refined flour and breakfast cereal with minerals which consists in blending a non-ionized salt of phytic acid selected from a group consisting of copper, iron, and manganese phytates, with the refined product in such proportion as to restore to the product approximately the mineral content thereof which existed prior to the refining thereof.

3. The method of fortifying edible flour and breakfast cereal with iron which comprises blending a non-ionized iron phytate salt with the refined product in such proportion as to restore to the product substantially the iron content thereof which existed prior to the refining of the product.

4. An edible solid mixture of a mineral fortified flour consisting of such a product blended with a non-ionized salt of phytic acid, selected from a group consisting of copper, iron, and manganese phytates.

5. An edible mineral fortified flour consisting of refined flour blended with a non-ionized iron phytate salt.

JOHN S. ANDREWS.
LACEY H. EVANS.
LOUIS J. HUBER.